(12) United States Patent
Dupont

(10) Patent No.: US 9,251,709 B2
(45) Date of Patent: Feb. 2, 2016

(54) LATERAL VEHICLE CONTACT WARNING SYSTEM

(71) Applicant: Nissan North America, Inc., Franklin, TN (US)

(72) Inventor: Florian Dupont, Nashville, TN (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 200 days.

(21) Appl. No.: 14/089,411

(22) Filed: Nov. 25, 2013

(65) Prior Publication Data

US 2015/0145694 A1    May 28, 2015

(51) Int. Cl.
- *G08G 1/16* (2006.01)
- *B60Q 1/34* (2006.01)
- *G01S 1/00* (2006.01)

(52) U.S. Cl.
CPC *G08G 1/167* (2013.01); *B60Q 1/34* (2013.01); *G01S 1/00* (2013.01); *G01S 2205/00* (2013.01)

(58) Field of Classification Search
None
See application file for complete search history.

(56) References Cited

U.S. PATENT DOCUMENTS

| | | | |
|---|---|---|---|
| 5,949,331 A | 9/1999 | Schofield et al. | |
| 6,092,619 A | 7/2000 | Nishikawa et al. | |
| 6,304,811 B1 | 10/2001 | Prestl | |
| 6,825,756 B2 | 11/2004 | Bai et al. | |
| 7,355,524 B2 | 4/2008 | Schofield | |
| 8,145,385 B2 | 3/2012 | Hayakawa et al. | |
| 8,244,408 B2 | 8/2012 | Lee et al. | |
| 2005/0232469 A1* | 10/2005 | Schofield et al. | 382/104 |
| 2005/0276058 A1* | 12/2005 | Romas et al. | 362/494 |
| 2007/0088490 A1* | 4/2007 | Sutardja | 701/117 |
| 2008/0201050 A1 | 8/2008 | Placke et al. | |
| 2014/0035738 A1* | 2/2014 | Kim | 340/435 |
| 2014/0200782 A1* | 7/2014 | Goudy et al. | 701/70 |

FOREIGN PATENT DOCUMENTS

| | | |
|---|---|---|
| DE | 102006002662 A1 | 8/2007 |
| EP | 1470957 A2 | 10/2004 |
| EP | 1312506 B1 | 12/2005 |
| JP | 2005182243 A | 7/2005 |
| JP | 2007182201 A | 7/2007 |
| JP | 2013054614 A | 3/2013 |
| WO | 03080390 A1 | 10/2003 |

* cited by examiner

*Primary Examiner* — Shirley Lu
(74) *Attorney, Agent, or Firm* — Global IP Counselors, LLP

(57) ABSTRACT

A vehicle contact warning system includes a detector system, a controller and a warning indicator. The detector system detects a distance between a remote vehicle and a host vehicle and whether a signal indicator on the remote vehicle is activated. The controller determines whether at least one of a signal indicator on the host vehicle is activated by a driver of the host vehicle and a speed at which the distance between the host vehicle and the remote vehicle is decreasing is greater than a predetermined speed. The warning indicator notifies the driver of the host vehicle upon the detector system detecting the signal indicator on the remote vehicle and the controller determining that at least one of the signal indicator of the host vehicle is activated and the speed at which the distance between the host vehicle and the remote vehicle is decreasing is greater than the predetermined speed.

20 Claims, 9 Drawing Sheets

LATERAL VEHICLE CONTACT WARNING SYSTEM

BACKGROUND

1. Field of the Invention

The present invention generally relates to a lateral contact warning system. More specifically, the present invention relates to a lateral contact warning system that warns of potentially conflicting lane change intentions between a host vehicle and a remote vehicle when both vehicles are attempting to laterally change lanes into the same lane.

2. Background Information

Conventional systems exist that are designed to warn of potential contact between vehicles and remote obstacles in situations in which vehicles pass too closely to each other. These conventional systems are generally effective on roads with at least two lanes and employ a high-performance ultrasonic sensor array for monitoring the lateral environment of the area surrounding a vehicle. If another vehicle enters a predefined zone around the vehicle, this activity is indicated on an information display. Should the other vehicle approach within a critical threshold distance, the information display is replaced by a warning and possibly a slight directional impulse to the steering wheel. If the driver reacts in accordance with this directional impulse, the threat of an impact event may be avoided.

Accordingly, to further advance such conventional systems, a need exists for an improved vehicle environment monitoring system.

SUMMARY

It has been discovered that in order to improve vehicle environment monitoring systems a lateral contact warning system may determine when a host vehicle and/or a remote vehicle has activated a turn signal or indicator, and determine when a distance between the host vehicle and the remote vehicle reduces at a faster rate than expected. Based on this information, the system may warn the driver of the host vehicle. In one disclosed embodiment, a vehicle contact warning system comprises a detector system, a controller and a warning indicator. The detector system is configured to detect a distance between a remote vehicle and a host vehicle equipped with the vehicle contact warning system and whether a signal indicator on the remote vehicle is activated. The controller is programmed to determine whether at least one of a signal indicator on the host vehicle is activated by a driver of the host vehicle and a speed at which the distance between the host vehicle and the remote vehicle is decreasing is greater than a predetermined speed. The warning indicator is configured to notify the driver of the host vehicle upon the detector system detecting the signal indicator on the remote vehicle and the controller determining that at least one of the signal indicator of the host vehicle is activated and the speed at which the distance between the host vehicle and the remote vehicle is decreasing is greater than the predetermined speed.

In another disclosed embodiment, a vehicle contact warning system comprises a detector system, a controller and a warning indicator. The detector system is configured to detect a distance between a host vehicle equipped with the vehicle contact warning system and a remote vehicle and whether a signal indicator on the remote vehicle is activated. The controller is programmed to determine when a signal indicator on the host vehicle is activated by a driver of the host vehicle and a speed at which a distance between the host vehicle and the remote vehicle is decreasing. The warning indicator is configured to notify the driver of the host vehicle upon the controller determining that the signal indicator of the host vehicle is activated and at least one of the detector system detecting the signal indicator on the remote vehicle and the controller determining that the speed at which the distance between the host vehicle and the remote vehicle is decreasing is greater than a predetermined speed.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

The disclosed embodiments are for a vehicle contact warning system 12 disposed on a host vehicle 10 that is configured to detect a remote vehicle 60 that intends to enter or is entering an adjacent lane into which the host vehicle 10 intends to enter or is entering. The vehicle contact warning system 12 enables detection of the remote vehicle 60 in a threat or detection zone TZ (i.e., a zone that basically encompasses the lane adjacent the lane in which the host vehicle 10 is traveling and the lane adjacent the adjacent lane) and warns the driver of the host vehicle 10 of conflicting lane change intentions between the host vehicle 10 and the remote vehicle 60.

Figure 1:
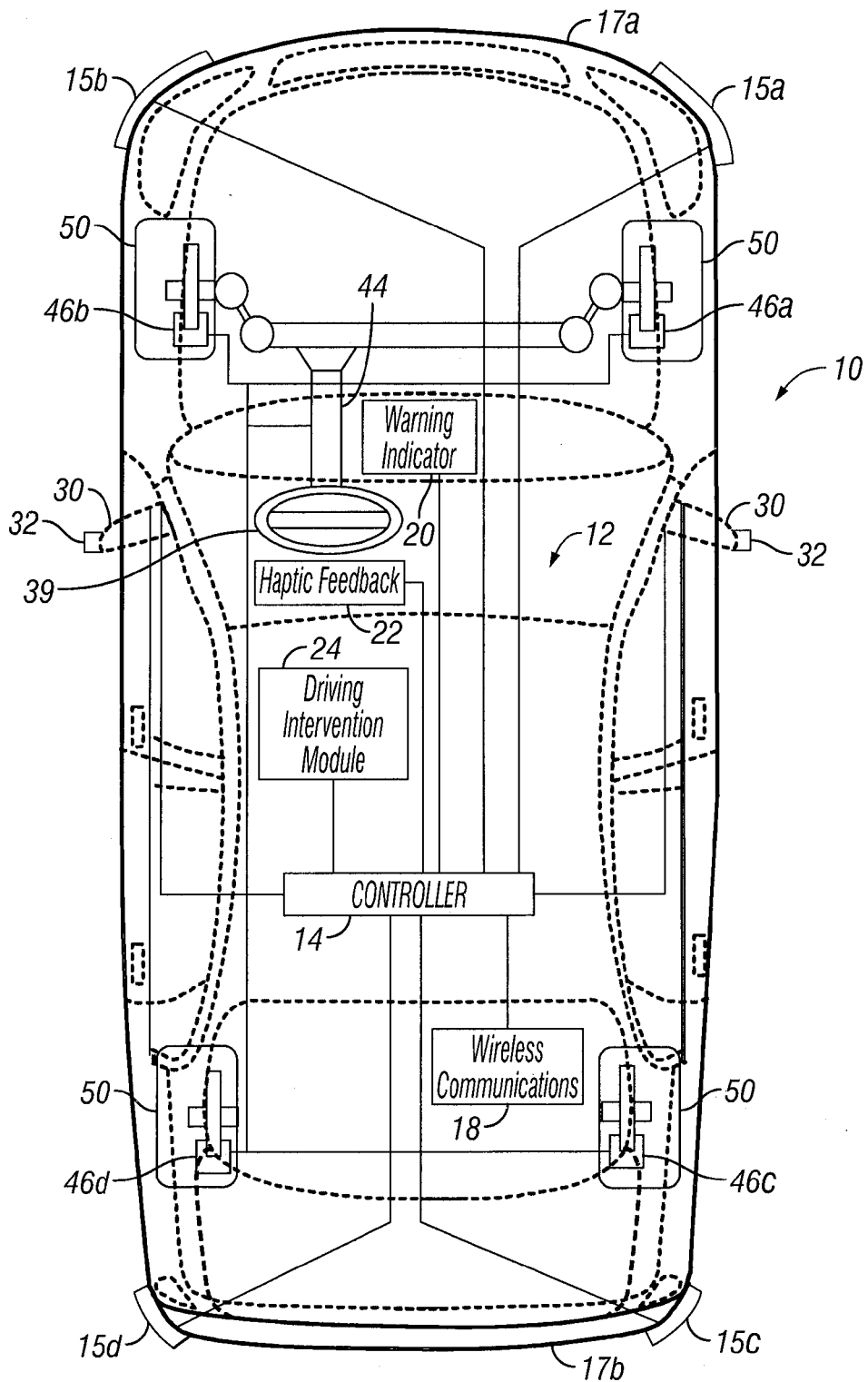
FIG. 1 is a plan view of a vehicle equipped with a vehicle contact warning system in accordance with one disclosed embodiment.
Figure 2:
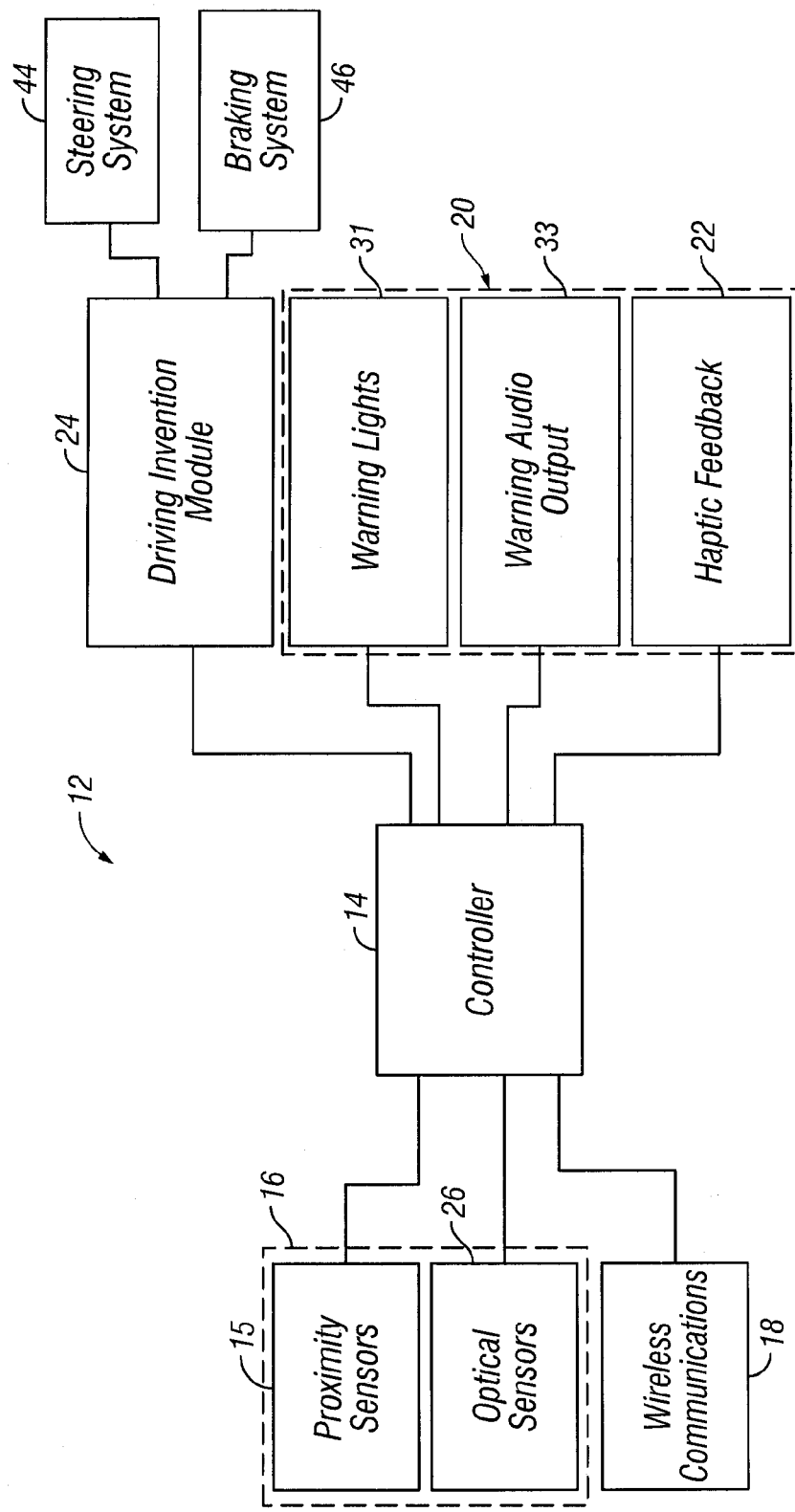
FIG. 2 schematically illustrates a vehicle contact warning system in accordance with one disclosed embodiment.

Referring initially to FIGS. 1 and 2, a vehicle contact warning system 12 for a host vehicle 10 is illustrated in accordance with a first embodiment. Vehicle contact warning system 12 includes a controller 14, a detection system 16, a wireless communications device 18, a warning system 20, which may include a haptic feedback system 22, and a driving intervention module 24.

The controller 14 preferably includes a microcomputer with a control program that controls the vehicle contact warning system 12 as discussed below. The controller 14 can also include other conventional components such as an input interface circuit, an output interface circuit, and storage devices such as a ROM (Read Only Memory) device and a RAM (Random Access Memory) device. The microcomputer of the controller 14 is programmed to control one or more of the sensors 15, 26, wireless communications device 18, warning system 20, haptic feedback system 22, and driving intervention module 24, and to make determinations or decisions, as discussed herein. The memory circuit stores processing results and control programs, such as ones for sensors 15, 26, wireless communications device 18, warning system 20, haptic feedback system 22, and driving intervention module 24 operation that are run by the processor circuit. The controller 14 is operatively coupled to the sensors 15, 26, the wireless communications device 18, the warning system 20, the haptic feedback system 22, and the driving intervention module 24 in a conventional manner, as well as other electrical systems in the vehicle, such the turn signals, windshield wipers, lights and any other suitable systems. Such a connection enables the controller 14 to monitor and control any of these systems as desired. The internal RAM of the controller 14 stores statuses of operational flags and various control data. The internal ROM of the controller 14 stores the information for various operations. The controller 14 is capable of selectively controlling any of the components of the vehicle contact warning system 12 in accordance with the control program. It will be apparent to those skilled in the art from this disclosure that the precise structure and algorithms for the controller 14 can be any combination of hardware and software that will carry out the functions of the present invention.

As illustrated in FIGS. 1 and 2, in one disclosed embodiment, the detection system 16 includes proximity sensors 15 and optical sensors 26. In one embodiment, the proximity sensors 15 include a plurality of remote vehicle sensors 15a, 15b, 15c and 15d, and are configured to detect a remote vehicle in proximity to the host vehicle 10. For example, as illustrated in FIG. 1, the remote vehicle sensors 15a, 15b, 15c and 15d are preferably mounted externally on the front bumper 17a and rear bumper 17b of host vehicle 10. However, the remote vehicle sensors 15a-d may be mounted on any suitable external portion of the host vehicle 10, including the front and rear quarter panels, the external mirrors 30 or any combination of suitable areas.

The detection system 16 is preferably configured to be capable of detecting a remote vehicle in a threat or detection zone TZ (i.e., a zone that basically encompasses the lane adjacent to the lane in which the host vehicle 10 is traveling and the lane adjacent the adjacent lane). However, the detection system 16 can be any type of system desired. The front sensors 15a and 15b can include a long-range radar device for object detection in front of the host vehicle 10. For example, the front sensors 15a and 15b may be configured to detect objects at a predetermined distance (e.g., distances up to 200 m), and thus may have a narrow field of view angle (e.g., around 15°). Due to the narrow field of view angle, long range radar may not detect all objects in the front of the host vehicle 10. Thus, if desired, the front corner sensors 15a and 15b can include short-range radar devices to assist in monitoring the region in front of the host vehicle 10. The rear sensors 15c and 15d may include short-range radar devices to assist in monitoring oncoming traffic beside and behind the host vehicle 10. Placement of the aforementioned sensors permits monitoring of traffic flow including remote vehicles and other objects around the host vehicle 10 as well as the position of the host vehicle 10 with respect to lane markers. However, the remote vehicle sensors 15a, 15b, 15c and 15d can be disposed in any position on the host vehicle 10 and may include any type and/or combination of sensors to enable detection of a remote vehicle in the threat zone. In addition, the remote vehicle sensors 15a-d may be cameras, radar sensors, photo sensors or any combination thereof. Although FIG. 1 illustrates four sensors, there can be as few or as many sensors as desirable or suitable.

Remote vehicle sensors 15a, 15b, 15c, and 15d can be electronic detection devices that transmit either electromagnetic waves (e.g., radar) or take computer-processed images with a digital camera and analyze the images or emit lasers, as is known in the art. The remote vehicle sensors 15a-d may be capable of detecting at least the speed, direction, yaw, acceleration and distance of the host vehicle 10 relative to the remote vehicle 60. Further, the remote vehicle sensors 15a-d may include object-locating sensing devices including range sensors, such as FM-CW (Frequency Modulated Continuous Wave) radars, pulse and FSK (Frequency Shift Keying) radars, sonar and Lidar (Light Detection and Ranging) devices, and ultrasonic devices which rely upon effects such as Doppler-effect measurements to locate forward objects. Object-locating devices may include charged-coupled devices (CCD) or complementary metal oxide semi-conductor (CMOS) video image sensors, and other known camera/video image processors which utilize digital photographic methods to "view" forward objects including one or more remote vehicles. The remote vehicle sensors 15a, 15b, 15c and 15d are in communication with the controller 14 and are capable of transmitting information to the controller 14. Thus, the controller 14 is programmed to determine at least if a remote vehicle is present in the threat zone based on the information supplied by the detection system 16.

Figure 4:
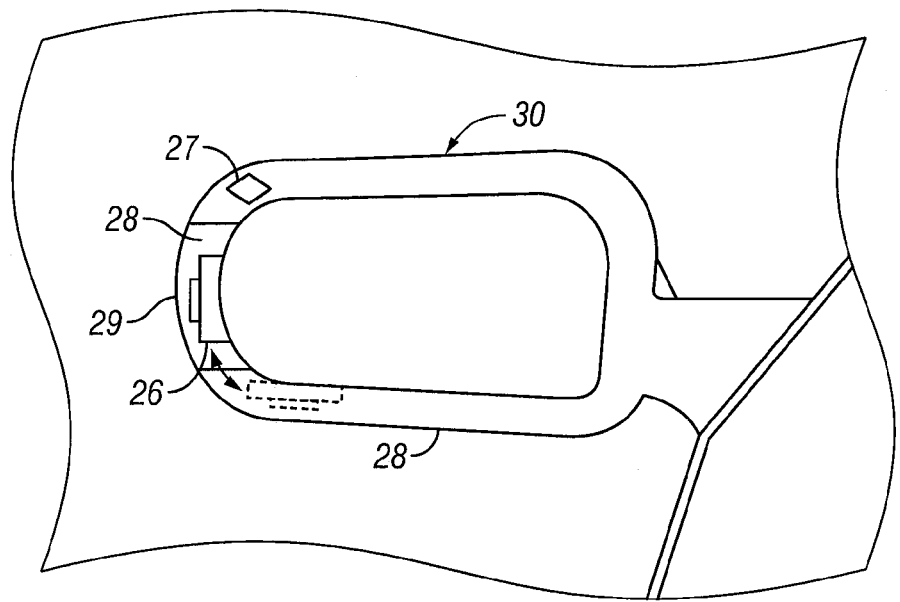
FIG. 4 is a profile view of an external rearview mirror, with a camera pivotally mounted on a housing of the external rearview mirror.

In one embodiment, as illustrated in FIG. 4, the detection system 16 may include an optical sensor, such as camera 26 disposed in a cavity or space 28 in the outer peripheral portion of a housing 28 of an external mirror 30. In one embodiment, the camera 26 is capable of viewing a remote vehicle, a remote vehicle turn signal or any other object desired through transparent window 29. However, the camera 26 can be positioned in any suitable position on or in the external mirror 30 or on or in the host vehicle 10. The camera 26, in a manner similar to that discussed above, may be a digital camera that is configured to detect a turn signal on a remote vehicle by taking computer-processed images and have images analyzed to determine the status of the remote vehicle turn signal. However, the camera 26 can be any suitable camera and operate in any desired manner.

Moreover, as illustrated in FIG. 4, the camera 26 can rotate within the housing 28. By rotating or moving, the camera field of vision can be increased such that the camera 26 is capable of determining the status of a remote vehicle turn signal in a desired zone and/or determine the presence of a remote vehicle in the threat zone, or any other desired area.

The camera 26 may operate in place of or in conjunction with the remote vehicle sensors 15a, 15b, 15c, and 15d. Thus in one embodiment, the camera 26 detects both the presence of a remote vehicle and a status of the turn signal of the remote vehicle. However, in another embodiment, the camera 26 determines only the status of the turn signal of the remote vehicle 60, while the remote vehicle sensors 15a, 15b, 15c, and 15d determine the presence of the remote vehicle 60. Still in another embodiment the remote vehicle sensors 15a, 15b, 15c, and 15d determine both the presence of the remote vehicle 60 and the condition of the turn signal of the remote vehicle 60.

Figure 5:
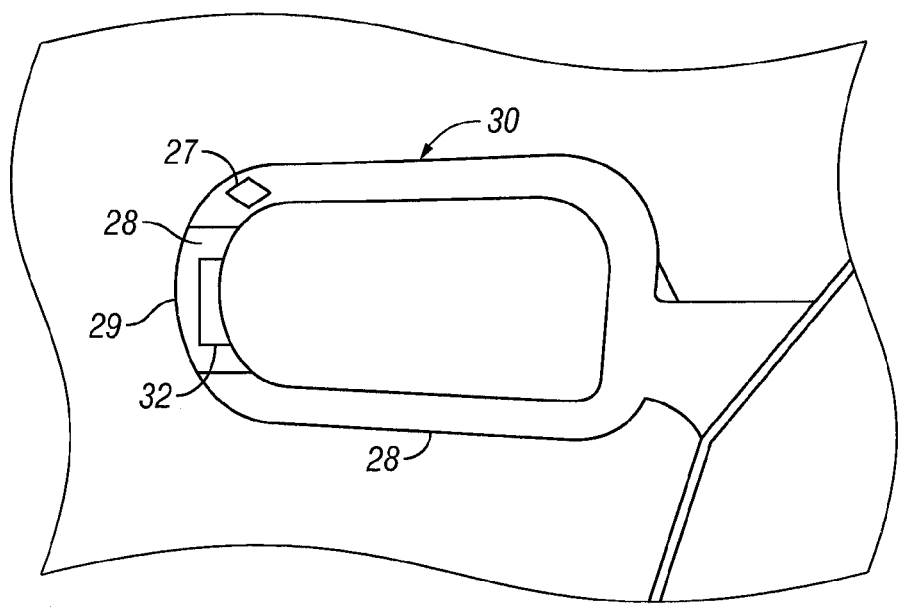
FIG. 5 is a profile view of another external rearview mirror, with a warning indicator disposed on a housing of the external rearview mirror.

As illustrated in FIG. 5, in one embodiment, the detection system 16 may include an optical sensor, such as photo sensor 32. Photo sensor 32 may be a photoelectric sensor, a photocell, a light-dependent resistor, or any other suitable device. The photo sensor 32 is operable to detect a turn signal in a manner similar to a human eye. Similarly to the camera 26, photo sensor 32 is disposed in cavity or space 28 in the outer peripheral portion of a housing 28 of an external mirror 30. In one embodiment, the photo sensor 32 is capable of viewing a remote vehicle, a remote vehicle turn signal or any other object desired through transparent window 29. However, the photo sensor 32 can be positioned in any suitable position on or in the external mirror 30 or on or in the host vehicle 10. In one embodiment, the photo sensor 32 provides an input signal to the controller 14 that is indicative of the turn signal status of the remote vehicle 60.

The photo sensor 32 may operate in place of or in conjunction with the remote vehicle sensors 15a, 15b, 15c, and 15d and camera 26. Thus in one embodiment, the photo sensor 32 detects both the presence of the remote vehicle 60 and the condition of the turn signal of the remote vehicle 60. However, in another embodiment, the photo sensor 32 determines the status of the turn signal of the remote vehicle 60, while the remote vehicle sensors 15a, 15b, 15c, and 15d determine the presence of the remote vehicle 60. Still in another embodiment the remote vehicle sensors 15a, 15b, 15c, and 15d determine both the presence of the remote vehicle 60 and the status of the turn signal of the remote vehicle 60.

Moreover, as illustrated in FIGS. 1 and 2, the vehicle contact warning system 12 includes a wireless communications device 18, such as a GPS. The GPS preferably includes a GPS antenna and a GPS receiver. In one embodiment the host vehicle 10 receives a GPS satellite signal. As is understood, the GPS processes the GPS satellite signal to determine positional information (such as location, speed, acceleration, yaw, and direction, just to name a few) of the host vehicle 10. Thus, in one example, the GPS can determine whether the host vehicle 10 is on a road with three or more lanes in the direction of travel of the host vehicle 10. The controller 14 may activate the vehicle contact warning system 12 when the number of lanes is determined to be 3 or more in the direction of travel of the host vehicle 10, or in any other desired situation. Moreover, in one embodiment, the GPS may determine whether the host vehicle 10 has maintained lane position or has departed or begun to depart from a lane. As noted herein, the wireless communications device 18 is in communication with the controller 14, and is capable of transmitting such positional information regarding the host vehicle 10 to the controller 14.

Figure 3:
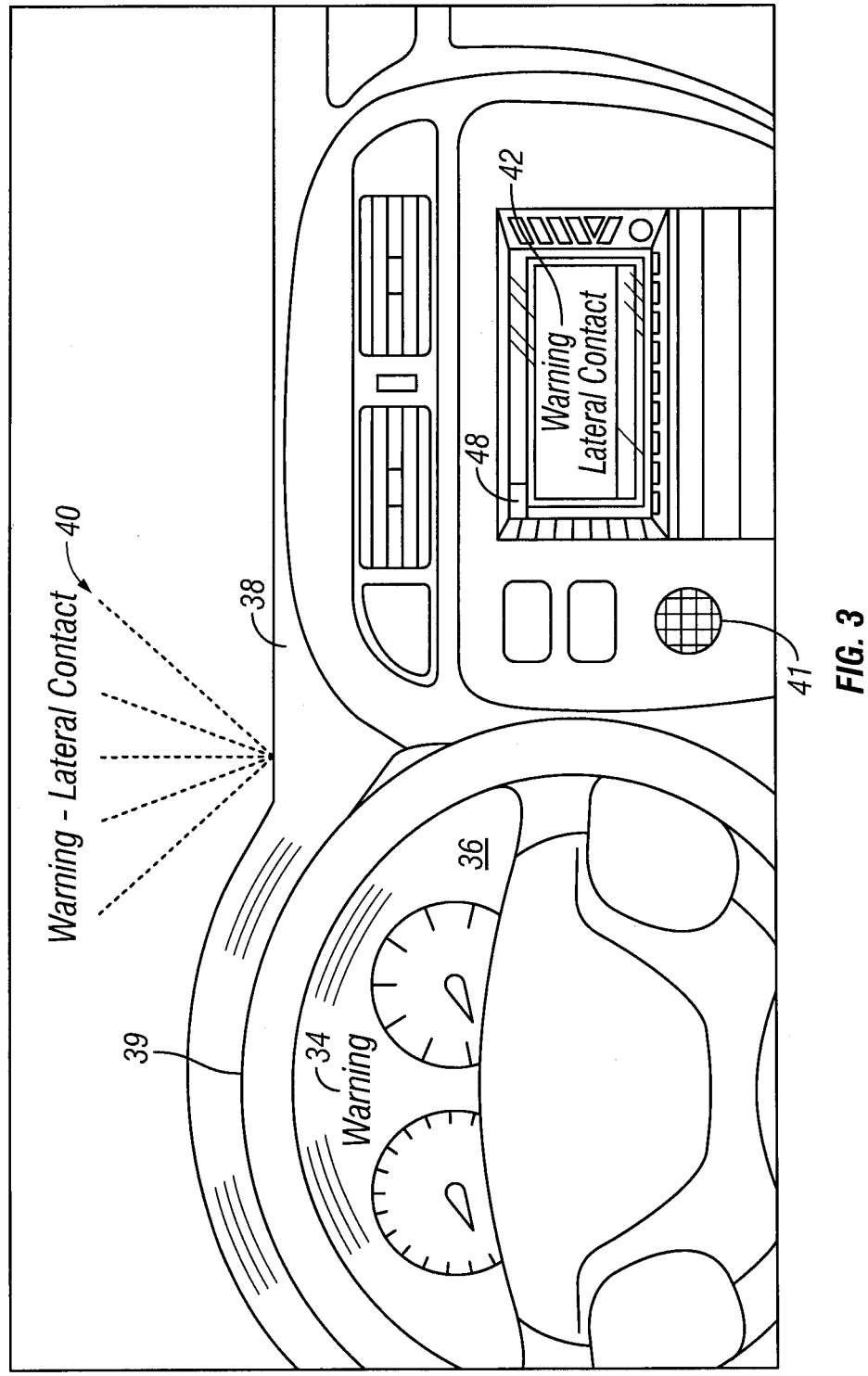
FIG. 3 is a partial interior view of the warning system in a host vehicle in accordance with one disclosed embodiment.

As illustrated in FIG. 2, the warning system 20 preferably includes warning lights 31, a warning audio output 33 and haptic feedback device 22 and is in communication with the controller 14. For example, turning to FIG. 3, one embodiment of the warning system 20 is illustrated. As shown in FIG. 3, the warning system 20 may include a visual display or light indicator 34 that flashes or illuminates the instrument cluster 36 on the dash board 38 of the host vehicle 10, activates a heads-up display 40, is a visual readout 42 in an information display unit 48, is an audible noise emitted from speaker 41, or any other suitable visual display or audio or sound indicator or combination thereof that notifies the driver or interior occupant of the host vehicle 10 that potentially conflicting lane change intentions exist. Further, in one embodiment, the warning system 20 includes a visual indicator or light 27 on the housing of the external mirror 30, as illustrated in FIGS. 4 and 5, or any other suitable portion of the external mirror 30 or portion of the vehicle.

The warning system 20 may also warn the driver of the host vehicle 10 of potentially conflicting lane change intentions using the haptic feedback device 22, as shown in FIGS. 1 and 2. That is, haptic feedback device 22 may include tactile feedback generated by a vibration actuator in the steering wheel 39, as shown in FIG. 3, the driver seat, or any other suitable location within the host vehicle 10.

In one embodiment the vehicle contact warning system 12 may include a driving intervention module 24, as shown in FIGS. 1 and 2. The driving intervention module 24 is configured to receive a signal from the controller 14 so as to control or alter the direction and/or speed of the host vehicle 10 to minimize a risk of contact with a remote vehicle after the warning system 20 is activated and the controller 14 determines the speed at which the distance between the host vehicle 10 and the remote vehicle 60 is decreasing is greater than a predetermined speed. As illustrated in FIGS. 1 and 2, the driving intervention module is connected to the steering system 44 of the host vehicle 10 and the braking system 46, including each of the brakes 46a, 46b, 46c, and 46d for each of the wheels 50 of the host vehicle 10. The driving intervention module preferably includes an electrical power steering system (EPS) coupled with an active front steering system (not shown) to augment or supplant operator input through steering wheel 39 by controlling a steering angle of the steerable wheels 50 during execution of an autonomic maneuver including minimization of possible contact with a remote vehicle. An exemplary active front steering system permits primary steering operation by the vehicle operator including augmenting steering wheel angle control when necessary to achieve a preferred steering angle and/or vehicle yaw angle. It is appreciated that the control methods described herein are applicable with modifications to vehicle steering control systems such as electrical power steering, four/rear wheel steering systems, and direct yaw control systems, which control the traction of each wheel to generate a yaw motion.

In one embodiment the driving intervention module 24 can control the speed of the host vehicle 10 by applying the brakes in any manner desired. For example, driving intervention module 24 may cause brake fluid pressure to be supplied to each of the wheel cylinders of the wheels 50. The amount of pressure supplied may be determined by the controller 14 in accordance with contact minimization. Similarly to the steering system, intervention module 24 permits primary braking operation by the vehicle operator including augmenting brake pressure when necessary to achieve a preferred stopping speed.

Figure 6A:
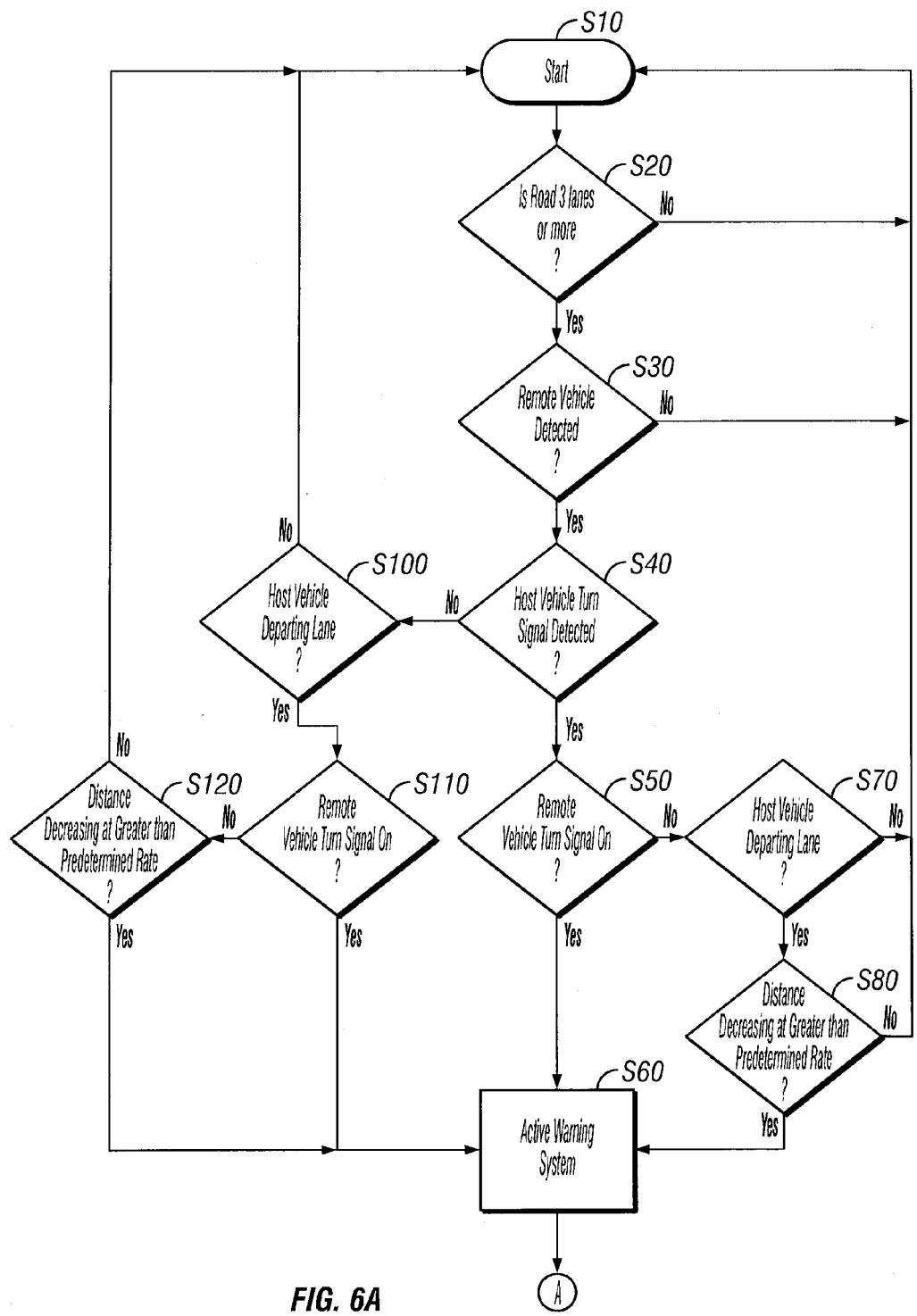
FIGS. 6A and 6B are a flow chart illustrating steps executed by a controller according to a disclosed embodiment.

Generally, as illustrated in FIG. 6A, when determining whether to activate the warning system 20, the controller 14 starts at step S10. The controller 14, using the wireless communications device 18 (e.g., a GPS) determines whether the road on which the host vehicle 10 is traveling is three (3) or more lanes (e.g., freeway driving) in a direction of travel of the host vehicle 10 at step S20. If the road has less than three (3) lanes, control returns to step S10, since it is unlikely that two vehicles can attempt to move into the same unoccupied lane at the same time, as described herein.

If the road has three (3) or more lanes, the controller 14 activates the detection system 16 at step S30. If a remote vehicle is not detected in the threat zone or detection zone TZ (see FIGS. 7-9), control returns to step S10. When a remote vehicle is detected in the threat zone TZ, the controller 14 determines whether a host vehicle turn signal 52 on the host vehicle 10 is active at step S40. If the host vehicle turn signal 52 is active, the detection system 16 determines whether a remote vehicle turn signal 54 is active at step S50. When both the remote vehicle turn signal 54 and the host vehicle turn signal 52 are active, the controller 14 activates the warning system 20 at step S60.

When the controller 14 determines that the host vehicle turn signal 52 is active but the remote vehicle turn signal 54 is not active, the controller 14 determines whether the host vehicle 10 is departing its lane (or has departed its lane) at step S70. Lane departure can be determined by the detection system 16 and/or the wireless communications device 18 (e.g., the GPS), or by any suitable lane departure system. If the host vehicle 10 is not departing its lane (or has not departed its lane), control returns to step S10.

If, however, the controller 14 determines that the host vehicle 10 is departing its lane (or has departed its lane), the controller 14 determines whether the distance between the host vehicle 10 and the remote vehicle 60 is decreasing at a greater rate than a predetermined rate at step S80, based on information supplied by the detection system 16. That is, based on the speed of the host vehicle 10, the angle of the steering wheel 39, and/or the detected position of lane markers, the controller 14 determines an expected rate at which the distance between the host vehicle 10 and the remote vehicle 60 would decrease if the remote vehicle 60 maintains a present lane. If, based on the information supplied by the detection system 16, the controller 14 determines that the rate of decrease in distance between the host vehicle 10 and remote vehicle 60 is greater than the predetermined rate, the remote vehicle 60 may be attempting to move into the same lane that the host vehicle 10 is moving towards. Thus, in this situation, the controller 14 activates the warning system 20 at step S60. If the rate of decrease in distance between the host vehicle 10 and remote vehicle 60 is not greater than the predetermined rate, the remote vehicle 60 is likely maintaining its present lane and control returns to step S10.

When the controller 14 determines that the driver of the host vehicle 10 has not activated the host vehicle turn signal 52 at step S40, the controller 14 then determines whether the host vehicle 10 is departing (or has departed) its lane at step S100, based on the information from the detection system 16 or the wireless communications device 18. If the host vehicle 10 is not departing (or has not departed) its lane, control returns to step S10. If, however, the controller 14 determines that the host vehicle 10 is departing from its lane, the controller 14 determines whether the remote vehicle turn signal 54 is active at step S110, based on the information detected by the detection system 16. If the remote vehicle turn signal 54 is active, the controller 14 activates the warning system 20 at step S60.

If the detector system 16 does not detect the remote vehicle turn signal 54 at step S110, the controller 14 determines whether the distance between the host vehicle 10 and the remote vehicle 60 is decreasing at a greater rate than a predetermined rate at step S120. If, based on the information supplied by the detection system 16, the controller 14 determines that the rate of decrease in distance between the host vehicle 10 and remote vehicle is greater than the predetermined rate, the remote vehicle 60 may be attempting to move into the same lane that the host vehicle 10 is moving towards. Thus, it this situation, the controller 14 activates the warning system 20 at step S60. If the rate of decrease in distance between the host vehicle 10 and remote vehicle 60 is not greater than the predetermined rate, the remote vehicle 60 is likely maintaining its present lane and control returns to step S10.

Figure 6B:
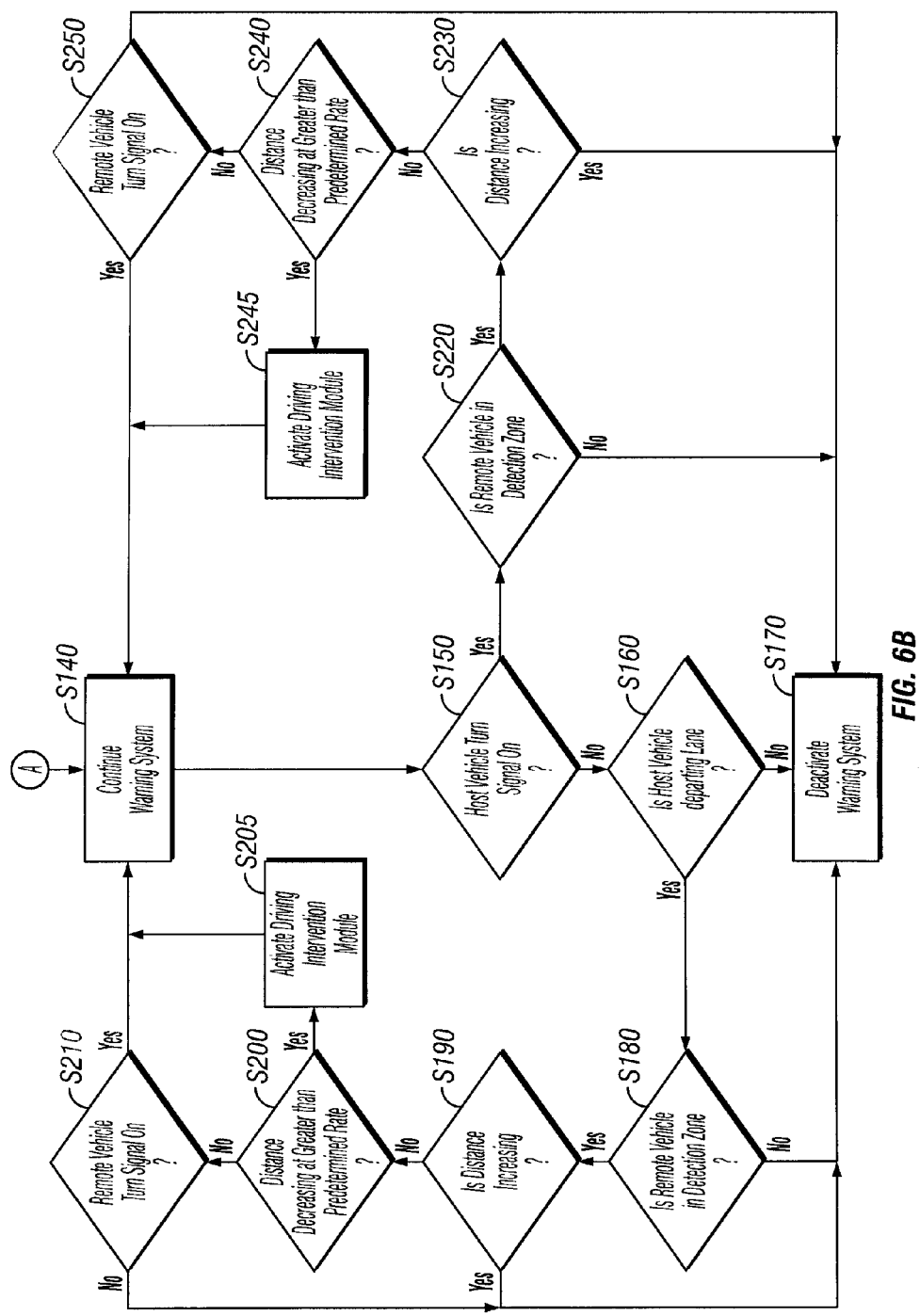

Now, continuing to point A in FIG. 6B from point A in FIG. 6A, deactivation of the warning system 20 will be discussed. The warning system 20 continues to be active at step S140. In deactivating the warning system 20, the controller 14 determines if the host vehicle turn signal 52 is on at step S150. If the host vehicle turn signal 52 is not active, the controller 14 then determines whether the host vehicle 10 is departing from its lane (or has returned to its lane) at step S160, based on the information from the detection system 16 or the wireless communications device 18. If the host vehicle 10 is not departing from its lane (or has returned to its lane), the controller 14 will then deactivate the warning system 20 at step S170. If, however, the host vehicle 10 is departing from its lane (or has departed from its lane), the controller 14 determines whether the remote vehicle 60 is still in the threat zone TZ at step S180, based on the information from the detection system 16. If the remote vehicle 60 is not in the threat zone, the controller 14 deactivates the warning system 20 at step S170. If however, if the controller 14 determines that the remote vehicle 60 is still in the threat zone TZ, the controller 14 determines whether the distance between the host vehicle 10 and the remote vehicle 60 is increasing at step S190, based on the information from the detection system 16. If the controller 14 determines that the distance between the host vehicle 10 and the remote vehicle 60 is increasing, it is likely that the remote vehicle 60 is changing lanes in the opposite direction or leaving the road, and the controller 14 deactivates the warning system 20 at step S170.

However, if the controller 14 determines that the distance between the remote vehicle 60 and the host vehicle 10 is not increasing, the controller 14 determines whether the distance between the host vehicle 10 and the remote vehicle 60 is decreasing at a greater rate than a predetermined rate at step S200. If, based on the information supplied by the detection system 16, the controller 14 determines that the rate of decrease in the distance between the host vehicle 10 and the remote vehicle 60 is greater than the predetermined rate, the remote vehicle 60 may be attempting to move into the same lane that the host vehicle 10 is moving towards. Therefore, the controller 14 maintains the warning system 20 in an activated state at step S140. Additionally in one embodiment, the controller 14 can activate the driving intervention module 24 to apply the brakes of the host vehicle 10 and/or operate the steering system so as to maintain separation between the host vehicle 10 and the remote vehicle 60 at step S205. The intensity of the braking and/or the angle at which the wheels 50 of the host vehicle 10 are turned can initially be subtle in an effort to gain the attention of the driver.

If the rate at which the distance between the host vehicle 10 and the remote vehicle 60 is decreasing is determined not to be greater than the predetermined rate at step S200, the remote vehicle 60 is likely maintaining its present lane; however, since the host vehicle 10 is departing its lane, the controller 14 determines if the remote vehicle 60 intends to change lanes. The controller 14 determines this by detecting the current state of the remote vehicle turn signal 54 at step S210, based on the information from the detection system 16. If the remote vehicle turn signal 54 is not active, the controller 14 deactivates the warning system 20. However, if the remote vehicle turn signal 54 is active, the controller 14 maintains the warning system 20 in an activated state.

If the host vehicle turn signal 52 is determined to be active in step S150, the controller 14 then determines whether the remote vehicle 60 is in the threat zone TZ at step S220, based on the information from the detection system 16. If the remote vehicle 60 is not in the threat zone TZ, the controller 14 deactivates the warning system 20 at step S170. If, however, the controller 14 determines that the remote vehicle 60 is still in the threat zone TZ, the controller 14 determines whether the distance between the host vehicle 10 and the remote vehicle 60 is increasing at step S230. If the controller 14 determines that the distance between the host vehicle 10 and the remote vehicle 60 is increasing, it is likely that the remote vehicle 60 is changing lanes in the opposite direction or leaving the road, and the controller 14 deactivates the warning system 20 at step S170.

However, if the controller 14 determines that the distance between the remote vehicle 60 and the host vehicle 10 is not increasing, the controller 14 determines whether the distance between the host vehicle 10 and the remote vehicle 60 is decreasing at a greater rate than a predetermined rate at step S240. If, based on the information supplied by the detection system 16, the controller 14 determines that the rate of decrease in the distance between the host vehicle 10 and remote vehicle is greater than the predetermined rate, the remote vehicle 60 may be attempting to move into the same lane that the host vehicle 10 is moving towards. Thus, the controller 14 maintains the warning system 20 in an activated state at step S140. Additionally, in one embodiment, the controller 14 can activate the driving intervention module 24 to apply the brakes of the host vehicle 10 and/or operate the steering system so as to maintain separation between the host vehicle 10 and the remote vehicle 60 at step S245. The intensity of the braking and/or the angle at which the wheels 50 of the host vehicle 10 are turned can initially be subtle in an effort to gain the attention of the driver.

If the rate at which the distance between the host vehicle 10 and the remote vehicle 60 is decreasing is determined not to be greater than the predetermined rate at step S240, the remote vehicle 60 is likely maintaining its present lane; however, since the host vehicle 10 is departing its lane, the controller 14 determines if the remote vehicle 60 intends to change lanes. The controller 14 determines this by detecting the current state of the remote vehicle turn signal 54 at step S250. If the remote vehicle turn signal 54 is not active, the controller 14 deactivates the warning system 20. However, if the remote vehicle turn signal 54 is activated, the controller 14 maintains the warning system 20 in an activated state.

It is noted that the steps described herein are optional and any number of decisions and/or steps may be removed or any additional steps may be added, as desired. Moreover, so long as the warning system 20 is maintained in an activated state, the vehicle contact warning system 12 executes the deactivation logic until the controller 14 determines that the warning system 20 is to be deactivated.

Figure 7:
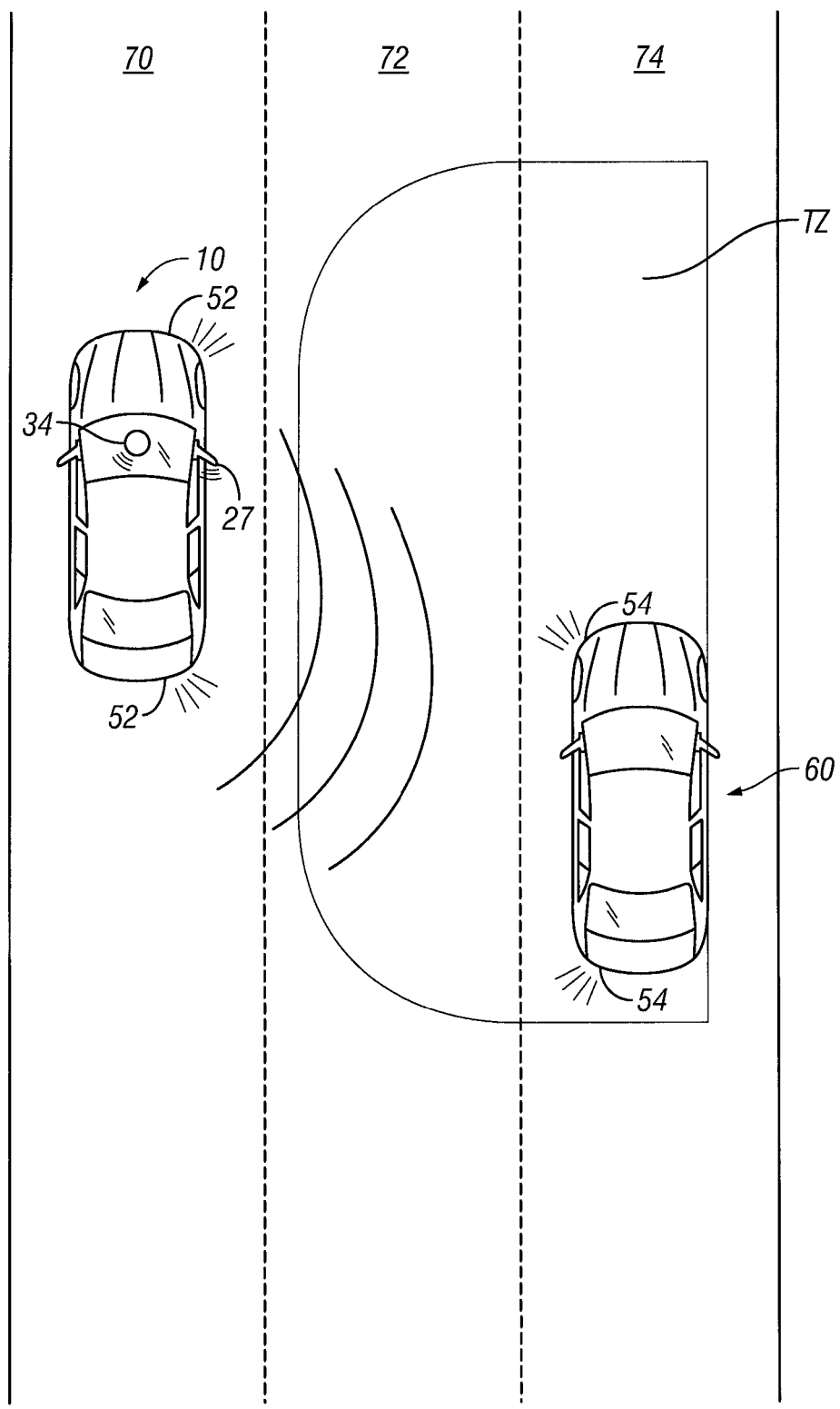
FIGS. 7-9 illustrate exemplary scenarios in which a host vehicle equipped with a vehicle contact warning system according to a disclosed embodiment detects a remote vehicle in a threat zone and activates a warning indicator to warn of potentially conflicting lane change intentions and maintain separation between the host vehicle and the remote vehicle.

FIG. 7 illustrates one scenario in which disclosed embodiments of the vehicle contact warning system 12 are advantageous. In this scenario, the road has three lanes, a first lane 70, a second lane 72 and a third lane 74. As is apparent, the host vehicle 10 is in the first lane 70 and the remote vehicle 60 is in the third lane 74, although the system 12 may operate with the host vehicle 10 being in the third lane 74 and the remote vehicle 60 being in the first lane 70, or any other lane assignment scenario.

As is shown in FIG. 7, the detection system 16 detects the remote vehicle 60 and the remote vehicle turn signal 54. Such detection can be performed in any manner described herein. Additionally, as shown, the driver of the host vehicle 10 activates the host vehicle turn signal 52. In this embodiment, the controller 14 activates the warning system 20 to indicate that the remote vehicle 60 may be attempting to move into the same lane that the host vehicle 10 is moving towards if the host vehicle 10 attempts to change lanes to the second lane 72. The controller 14 deactivates the warning system 20 upon deactivation of either the remote vehicle turn signal 54 or the host vehicle turn signal 52.

Figure 8:
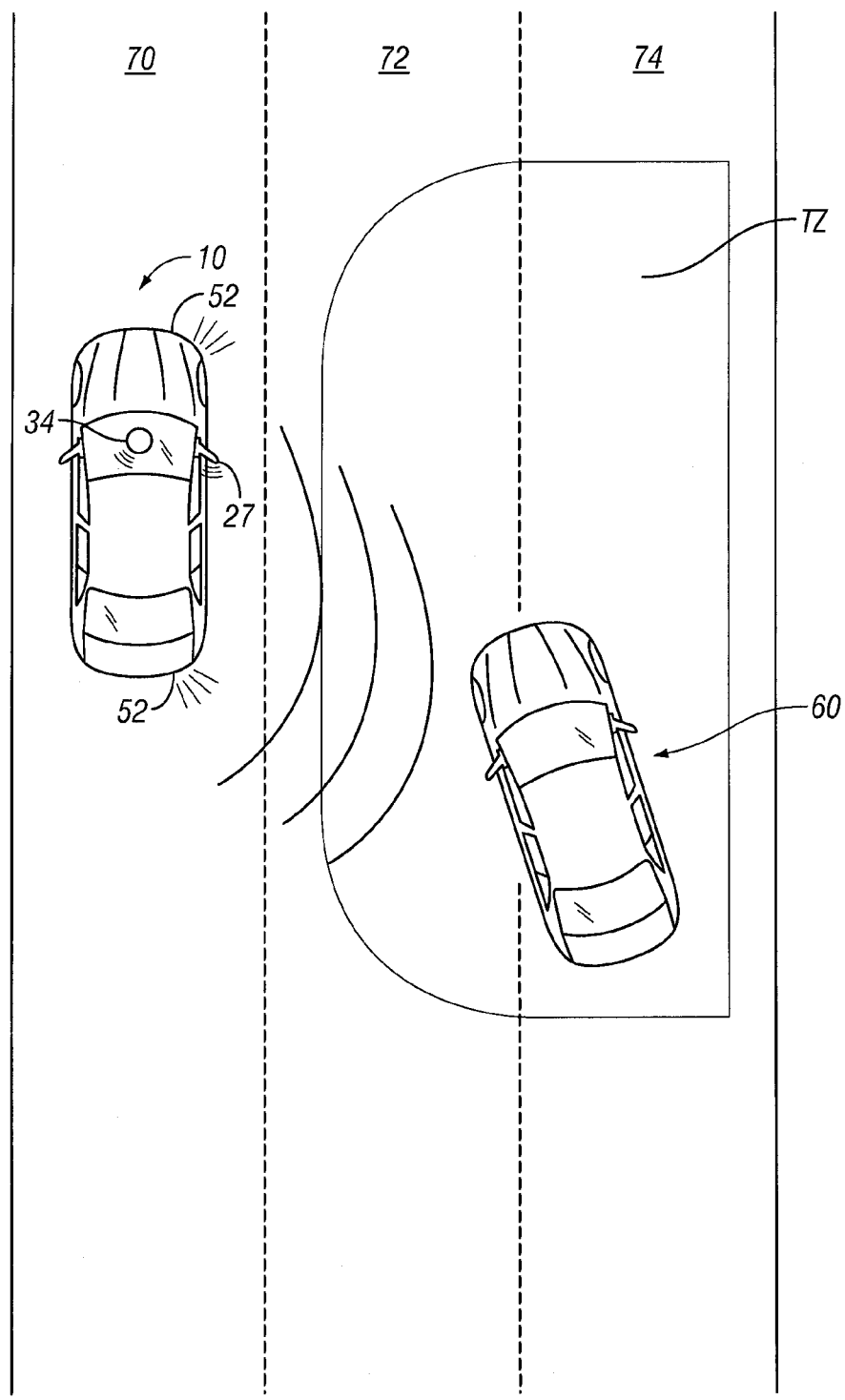

FIG. 8 illustrates another scenario in which disclosed embodiments of the vehicle contact warning system 12 are advantageous. In this scenario, the road has three lanes, a first lane 70, a second lane 72 and a third lane 74. As is apparent, the host vehicle 10 is in the first lane 70 and the remote vehicle 60 originated from the third lane 74, although the system may operate with the host vehicle 10 being in the third lane 74 and the remote vehicle 60 originating in the first lane 70, or any other lane assignment scenario.

As is shown in FIG. 8, the detection system 16 detects the remote vehicle 60 but does not detect the remote vehicle turn signal 54. Such detection can be performed in any manner described herein. As illustrated, the driver of the host vehicle 10 activates the host vehicle turn signal 52. In this embodiment, the controller 14 activates the warning system 20 to indicate that the remote vehicle 60 may be attempting to move into the same lane that the host vehicle 10 is moving towards if the host vehicle 10 attempts to change lanes to the second lane 72. As the host vehicle 10 departs the first lane 70, the controller 14 determines that the distance between the host vehicle 10 and the remote vehicle 60 is decreasing at a greater rate than a predetermined rate. The controller 14 subsequently deactivates the warning system 20 upon deactivation of the host vehicle turn signal 52 or upon the remote vehicle 60 returning to the third lane 74.

Moreover, if the driver of the host vehicle 10 departs from the first lane 70 and the controller 14 determines that the remote vehicle 60 is attempting to move into the same lane that the host vehicle 10 is moving towards, the controller 14 may activate the driving intervention module 24 to maintain separation between the host vehicle 10 and the remote vehicle 60, as described herein.

Figure 9:
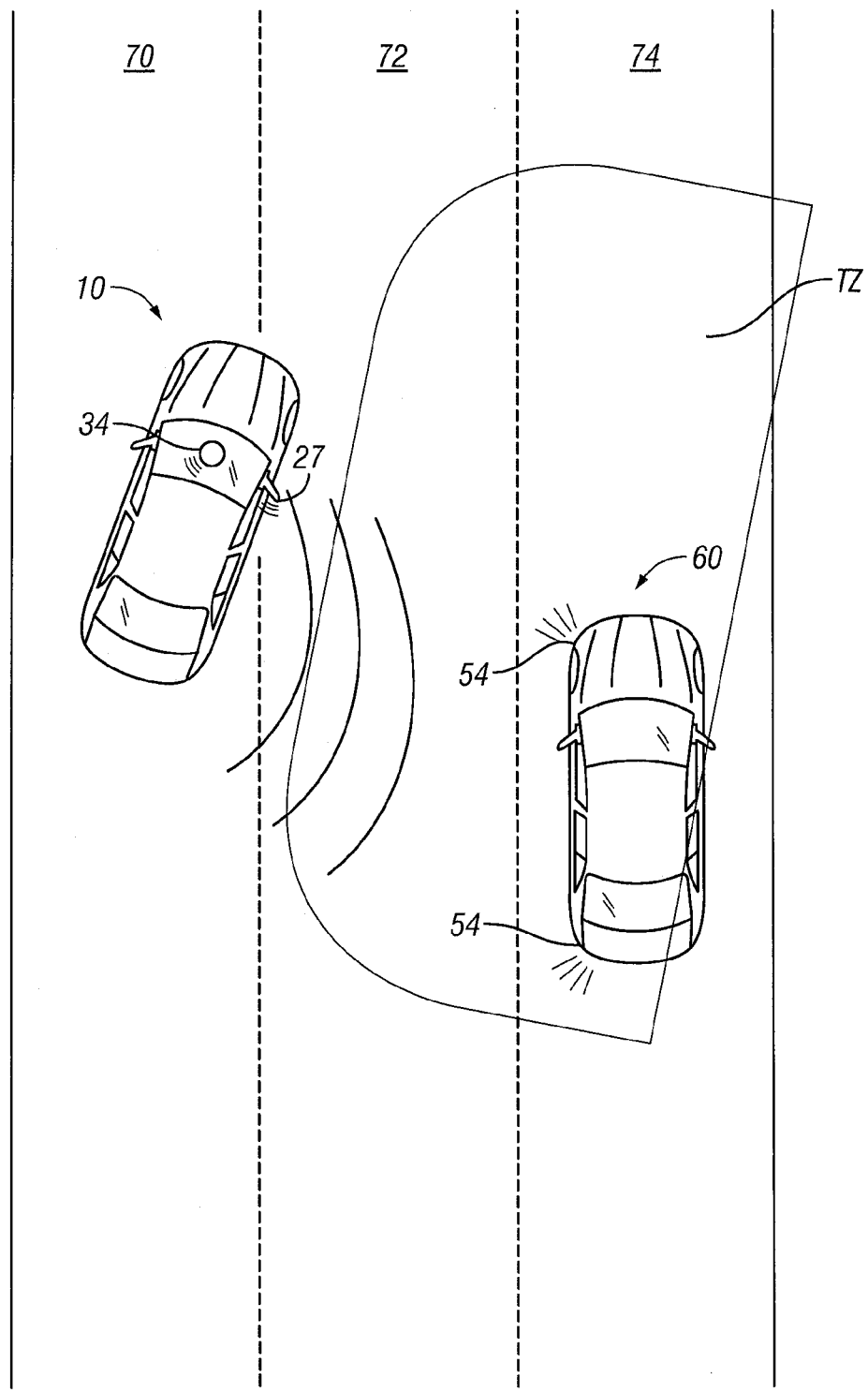

FIG. 9 illustrates yet another scenario in which disclosed embodiments of the vehicle contact warning system 12 are advantageous. In this scenario, the road has three lanes, a first lane 70, a second lane 72 and a third lane 74. As is apparent, the host vehicle 10 originated from the first lane 70 and the remote vehicle 60 is in the third lane 74, although the system 12 may operate with the host vehicle 10 originating from the third lane 74 and the remote vehicle 60 being in the first lane 70, or any other lane assignment scenario.

As is shown in FIG. 9, the detection system 16 detects the remote vehicle 60 and the remote vehicle turn signal 54. Such detection can be performed in any manner described herein. As shown, the driver of the host vehicle 10 has not activated the host vehicle turn signal 52. In this scenario, the controller 14 activates the warning system 20 to indicate that the remote vehicle 60 may be attempting to move into the same lane that the host vehicle 10 is moving towards if the remote vehicle 60 attempts to change lanes to the second lane 72. As the remote vehicle 60 departs the first lane 70, the controller 14 determines that the distance between the host vehicle 10 and the remote vehicle 60 is decreasing at a greater rate than a predetermined rate. The controller 14 subsequently deactivates the warning system 20 upon deactivation of the remote vehicle turn signal 54 or upon the host vehicle 10 returning to the first lane 70.

Moreover, if the remote vehicle 60 departs from the third lane 74 and the controller 14 determines that the remote vehicle 60 is attempting to move into the same lane that the host vehicle 10 is moving towards, the controller 14 may activate the driving intervention module to maintain separation between the host vehicle 10 and the remote vehicle 60, as described herein.

The wheels, brakes and steering system are conventional components that are well known in the art. Since the wheels, brakes and steering system are well known in the art, these structures are not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and including and their derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "section," "portion," or "element" when used in the singular can have the dual meaning of a single part or a plurality of parts. Also as used herein to describe the above embodiments, the following directional terms "forward" and "rear", as well as any other similar directional terms refer to those directions of a vehicle equipped with the vehicle contact warning system 12. Accordingly, these terms, as utilized to describe the present invention should be interpreted relative to a vehicle equipped with the vehicle contact warning system 12.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle contact warning system comprising:
a detector system configured to detect a distance between a remote vehicle and a host vehicle equipped with the vehicle contact warning system and whether a signal indicator on the remote vehicle is activated;
a controller programmed to determine whether at least one of a signal indicator on the host vehicle is activated by a driver of the host vehicle and a speed at which the distance between the host vehicle and the remote vehicle is decreasing is greater than a predetermined speed; and
a warning indicator configured to notify the driver of the host vehicle upon the detector system detecting the signal indicator on the remote vehicle and the controller determining that at least one of the signal indicator of the host vehicle is activated and the speed at which the distance between the host vehicle and the remote vehicle is decreasing is greater than the predetermined speed.

2. The vehicle contact warning system according to claim 1, further comprising
a global positioning system (GPS) configured to determine a number of traveling lanes of a road on which the host vehicle is traveling, with the controller being configured to activate the vehicle contact warning system only when the GPS determines that the number of traveling lanes is 3 or more in a direction of travel of the host vehicle.

3. The vehicle contact warning system according to claim 1, wherein
the warning indicator is at least one of a visible indicator, a haptic indicator and an audible indicator.

4. The vehicle contact warning system according to claim 1, wherein
the warning indicator is a haptic indicator including a vibration actuator configured to vibrate at least one of a steering wheel and a driver seat of the host vehicle.

5. The vehicle contact warning system according to claim 1, wherein
the warning indicator is at least one of a visible indicator on an instrument cluster of the host vehicle and a visible indicator generated on a heads-up display.

6. The vehicle contact warning system according to claim 1, wherein
the controller is configured to alter at least one of a direction and a speed of the host vehicle to maintain separation between the host vehicle and the remote vehicle after the controller activates the warning indicator and determines that the speed at which the distance between the host vehicle and the remote vehicle is decreasing is greater than the predetermined speed.

7. The vehicle contact warning system according to claim 1, wherein
the detector system includes a camera disposed on at least one of an external rearview mirror housing and an external surface of the host vehicle.

8. The vehicle contact warning system according to claim 7, wherein
the camera is pivotally mounted on the external rearview mirror housing.

9. The vehicle contact warning system according to claim 1, wherein
the detector system includes a photo sensor disposed on at least one of an external surface and an external rearview mirror housing of the host vehicle.

10. The vehicle contact warning system according to claim 1, wherein
the detector system is configured to detect a remote vehicle disposed on a third lane of a road when the host vehicle is disposed on a first lane of the road, and a second lane of the road is situated between the first and second lanes.

11. A vehicle contact warning system comprising:
a detector system configured to detect a distance between a host vehicle equipped with the vehicle contact warning system and a remote vehicle and whether a signal indicator on the remote vehicle is activated;
a controller programmed to determine when a signal indicator on the host vehicle is activated by a driver of the host vehicle and a speed at which a distance between the host vehicle and the remote vehicle is decreasing; and
a warning indicator configured to notify the driver of the host vehicle upon the controller determining that the signal indicator of the host vehicle is activated and at least one of the detector system detecting the signal indicator on the remote vehicle and the controller determining that the speed at which the distance between the host vehicle and the remote vehicle is decreasing is greater than a predetermined speed.

12. The vehicle contact warning system according to claim 11, wherein
the warning indicator is at least one of a visible indicator, a haptic indicator and an audible indicator.

13. The vehicle contact warning system according to claim 11, wherein
the warning indicator is a haptic indicator including a vibration actuator configured to vibrate at least one of a steering wheel and a driver seat of the host vehicle.

14. The vehicle contact warning system according to claim 11, wherein
the warning indicator is disposed on an external rearview mirror housing of the host vehicle.

15. The vehicle contact warning system according to claim 11, further comprising
a global positioning system (GPS) configured to determine a number of traveling lanes of a road on which the host vehicle is traveling, with the controller being configured to activate the vehicle contact warning system only when the GPS determines that the number of traveling lanes is 3 or more in a direction of travel of the host vehicle.

16. The vehicle contact warning system according to claim 11, wherein
the controller is configured to alter at least one of a direction and a speed of the host vehicle to maintain separation between the host vehicle and the remote vehicle after the controller activates the warning indicator and determines that the speed at which the distance between the host vehicle and the remote vehicle is decreasing is greater than the predetermined speed.

17. The vehicle contact warning system according to claim 11, wherein
the detector system includes a camera disposed on at least one of an external rearview mirror housing of the host vehicle and an external surface of the host vehicle.

18. The vehicle contact warning system according to claim 17, wherein
the camera is pivotally mounted on the external rearview mirror housing.

19. The vehicle contact warning system according to claim 11, wherein
the detector system includes a photo sensor disposed on at least one an external surface and an external rearview mirror housing of the host vehicle.

20. The vehicle contact warning system according to claim 11, wherein
the detector system is configured to detect a remote vehicle disposed on a third lane of a road when the host vehicle is disposed on a first lane of the road, and
a second lane of the road is situated between the first and second lanes.

\* \* \* \* \*